US011010021B2

(12) United States Patent
Totale et al.

(10) Patent No.: US 11,010,021 B2
(45) Date of Patent: *May 18, 2021

(54) CONTEXT MENU FRAGMENT MANAGEMENT

(71) Applicant: OPEN TEXT CORPORATION, Waterloo (CA)

(72) Inventors: Sachin Gopaldas Totale, Pleasanton, CA (US); Deepak Michael, Bangalore (IN); Saif Ali Ansari, Namchi (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,154

(22) Filed: Jan. 31, 2020

(65) Prior Publication Data

US 2020/0167049 A1     May 28, 2020

Related U.S. Application Data

(63) Continuation of application No. 16/450,899, filed on Jun. 24, 2019, now Pat. No. 10,564,811, which is a continuation of application No. 14/671,289, filed on Mar. 27, 2015, now Pat. No. 10,353,541.

(51) Int. Cl.
*G06F 3/0482*     (2013.01)
*G06F 3/0484*     (2013.01)
*G06F 8/38*     (2018.01)

(52) U.S. Cl.
CPC ........ *G06F 3/0482* (2013.01); *G06F 3/04842* (2013.01); *G06F 8/38* (2013.01)

(58) Field of Classification Search
CPC ....... G06F 3/0482; G06F 3/04842; G06F 8/38
See application file for complete search history.

(56) References Cited

U.S. PATENT DOCUMENTS

| 5,345,550 A * | 9/1994 | Bloomfield ............. G06F 9/451 |
| | | 715/841 |
| 5,644,738 A | 7/1997 | Goldman et al. |
| 6,263,217 B1 | 7/2001 | Park |

(Continued)

OTHER PUBLICATIONS

EMC, "Getting Started with xCP 2.0", XCP2.0 Self-Paced Tutorial, Dec. 2012, 207 pages.

(Continued)

*Primary Examiner* — Andrew T Chiusano
(74) *Attorney, Agent, or Firm* — Sprinkle IP Law Group

(57) ABSTRACT

Context menu fragment management includes receiving an event to trigger display of a context menu based on user interaction with a page of a web application and generating the context menu for display in a page. Generating the context menu includes executing a context menu fragment expression to output a first context menu fragment identifier from a set of possible context menu fragment identifiers, based on the first context menu fragment identifier output from execution of the context menu fragment expression, selecting a first context menu fragment from a plurality of context menu fragments, generating a first portion of the context menu using the first context menu fragment and adding the first portion of the context menu to the context menu.

22 Claims, 10 Drawing Sheets

(56) References Cited

U.S. PATENT DOCUMENTS

| | | | |
|---|---|---|---|
| 7,043,715 B1* | 5/2006 | Bauer | G06F 8/38 |
| | | | 717/107 |
| 7,590,430 B1 | 9/2009 | Urbanek | |
| 10,353,541 B1 | 7/2019 | Totale et al. | |
| 10,564,811 B2 | 2/2020 | Totale et al. | |
| 2005/0039141 A1 | 2/2005 | Burke et al. | |
| 2006/0184898 A1 | 8/2006 | Kern | |
| 2007/0113201 A1 | 5/2007 | Bales et al. | |
| 2008/0126984 A1 | 5/2008 | Fleishman et al. | |
| 2008/0163260 A1 | 7/2008 | Lin et al. | |
| 2008/0243529 A1* | 10/2008 | Fischer | G06Q 10/10 |
| | | | 705/1.1 |
| 2009/0024983 A1 | 1/2009 | Vedula | |
| 2009/0049123 A1 | 2/2009 | Dargahi et al. | |
| 2010/0088343 A1 | 4/2010 | Goldberg et al. | |
| 2010/0100869 A1* | 4/2010 | Fresko | G06F 8/38 |
| | | | 717/109 |
| 2011/0078617 A1 | 3/2011 | Kumagai et al. | |
| 2011/0145767 A1* | 6/2011 | Satou | G06F 9/451 |
| | | | 715/841 |
| 2011/0265035 A1* | 10/2011 | Lepage | G06F 3/0482 |
| | | | 715/810 |
| 2013/0074010 A1 | 3/2013 | Zhao | |
| 2013/0174041 A1 | 7/2013 | Chakravarthy | |
| 2015/0026642 A1 | 1/2015 | Wilson et al. | |
| 2016/0321165 A1 | 11/2016 | Totale et al. | |
| 2016/0321166 A1 | 11/2016 | Totale et al. | |
| 2019/0310747 A1 | 10/2019 | Totale et al. | |

OTHER PUBLICATIONS

EMC Documentum xCP Designer Help Version 2.0 User Guide, EMC Corporation, 2012, 325 pages.

EMC Documentum xCelerated Composition Platform Designer Help Version 2.1 User Guide, EMC Corporation, Corporate Headquarters, Hopkinton, MA, 2014, 373 pages.

EMC Documentum xCelerated Composition Platform: Version 2.1 Developer Guide, EMC Corporation, Corporate Headquarters, Hopkinton, MA, 2014, 82 pages.

Office Action issued for U.S. Appl. No. 14/671,289, dated Aug. 4, 2017, 15 pages.

Office Action issued for U.S. Appl. No. 14/671,289, dated Dec. 26, 2017, 16 pages.

Office Action issued for U.S. Appl. No. 14/671,289, dated Jul. 26, 2018, 16 pages.

Notice of Allowance issued for U.S. Appl. No. 14/671,289, dated Mar. 4, 2019, 8 pages.

Notice of Allowance issued for U.S. Appl. No. 16/450,899, dated Oct. 7, 2019, 9 pages.

* cited by examiner

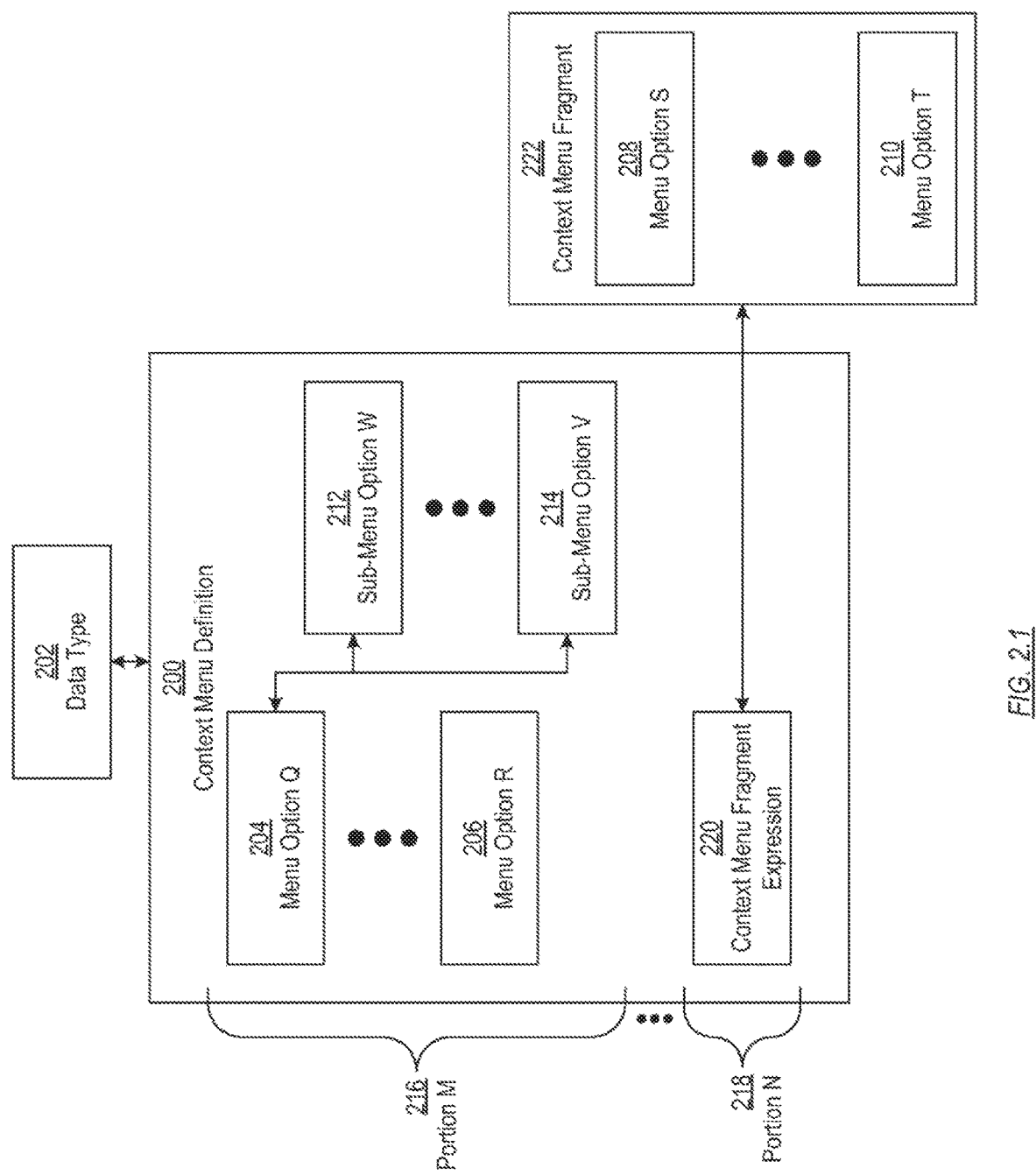
FIG. 2.1

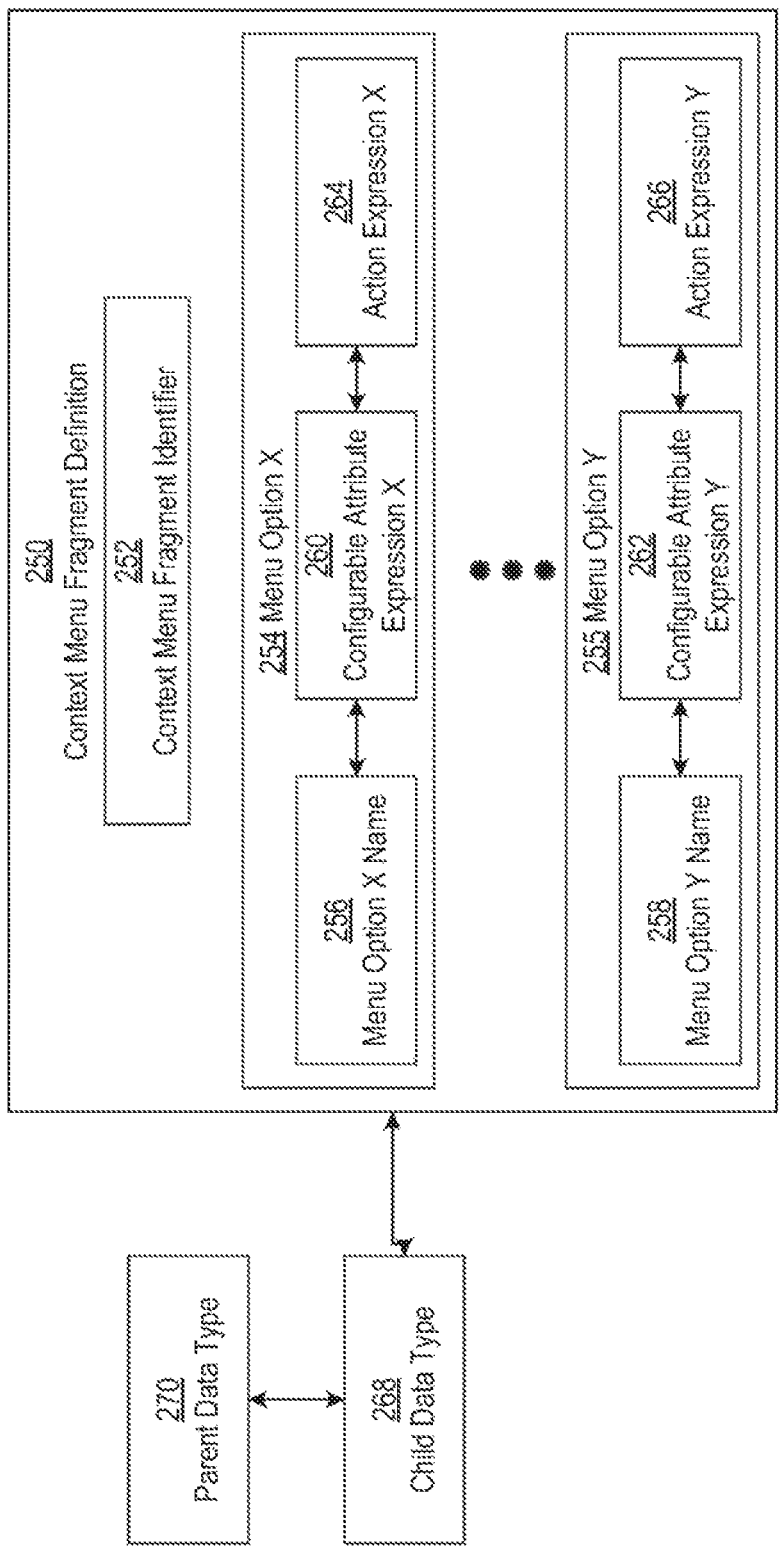
FIG. 2.2

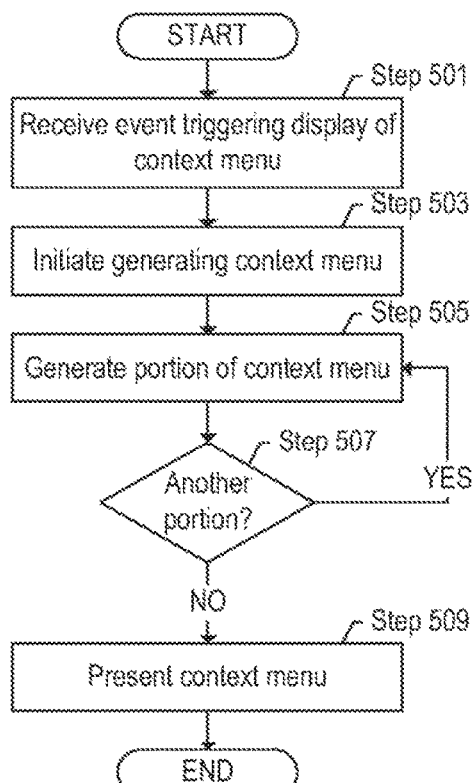
FIG. 5.1
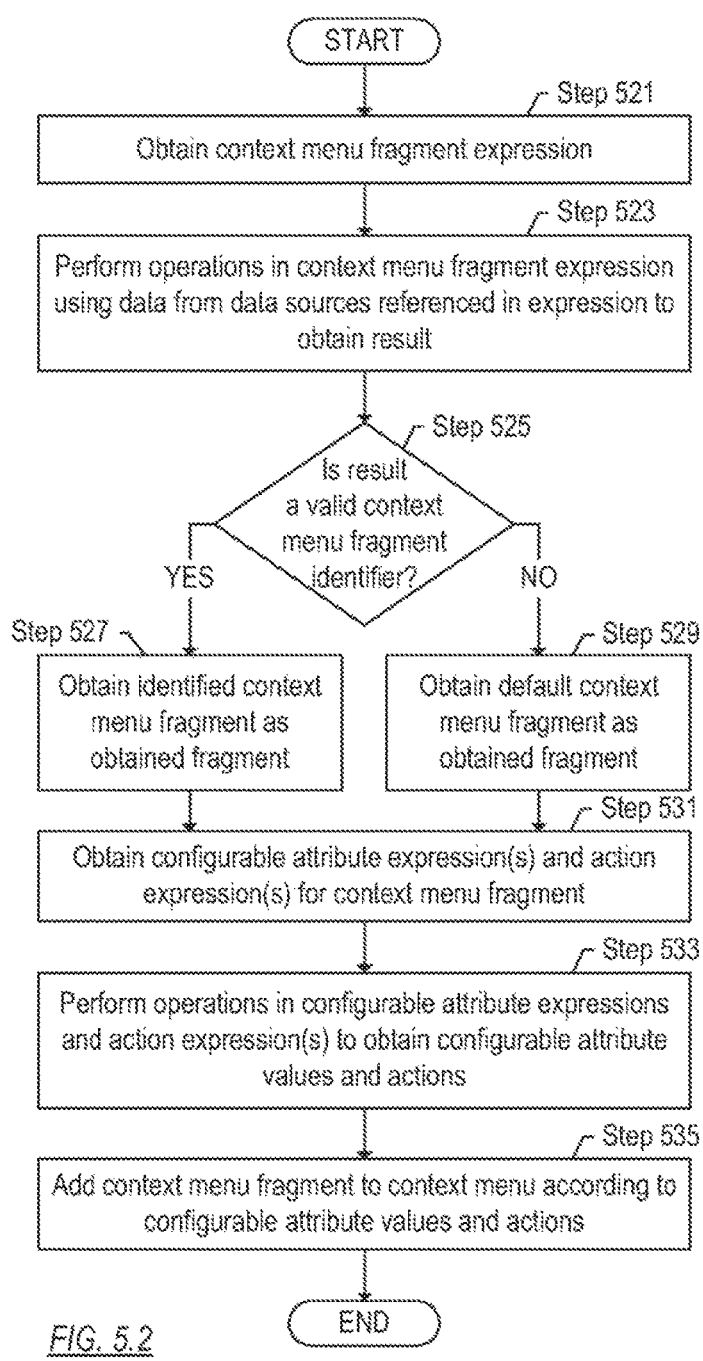
FIG. 5.2

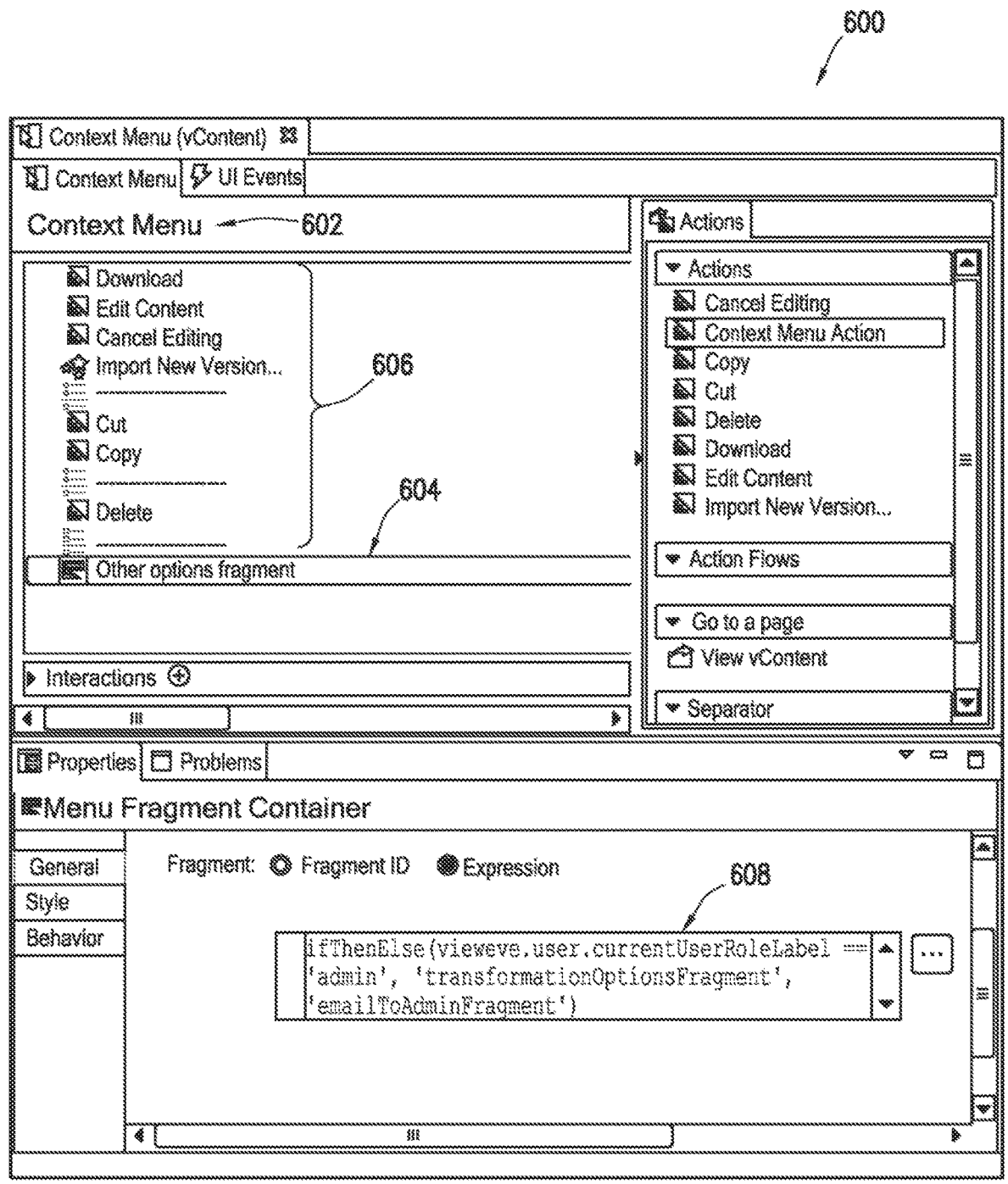
FIG. 6.1

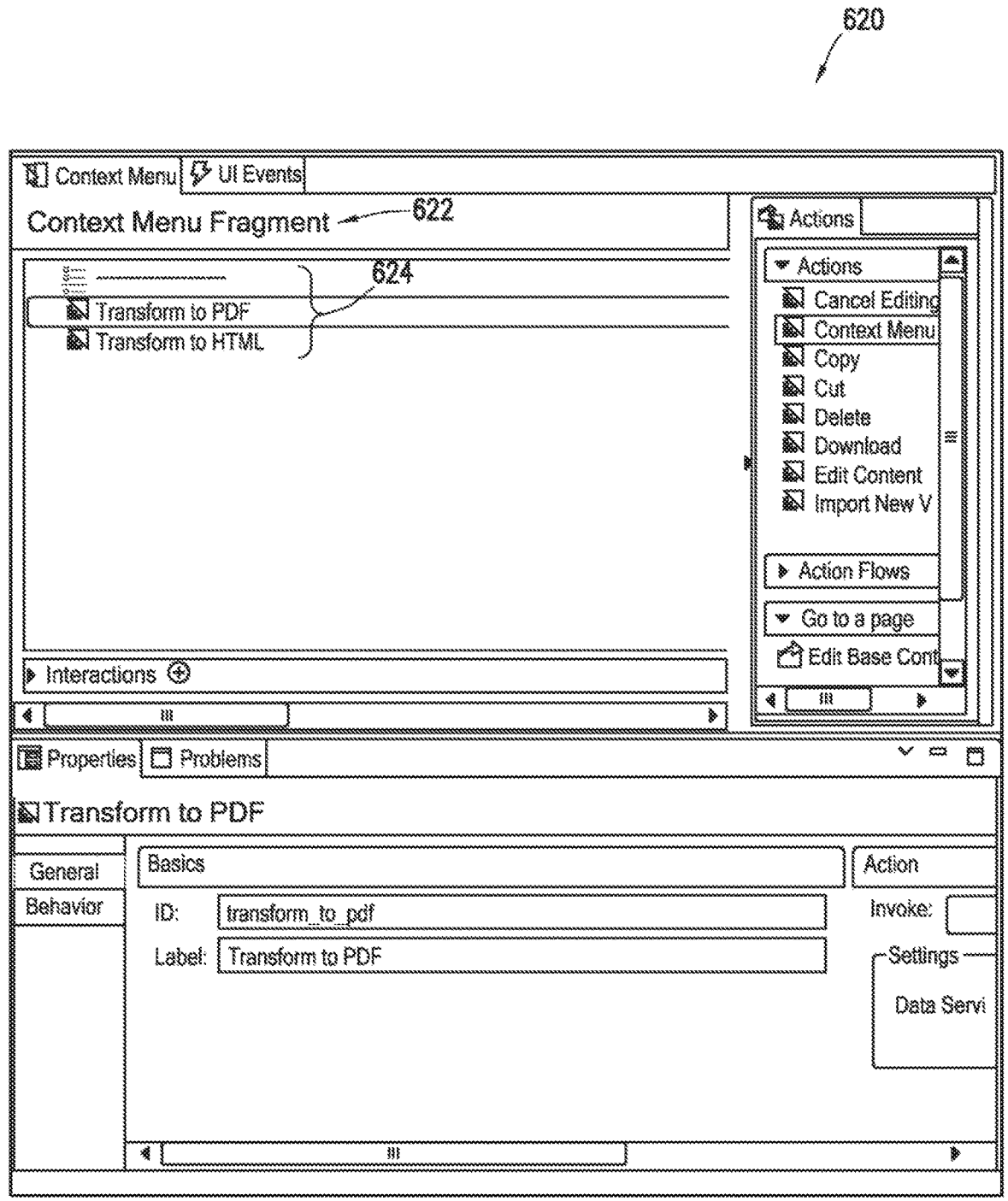
FIG. 6.2

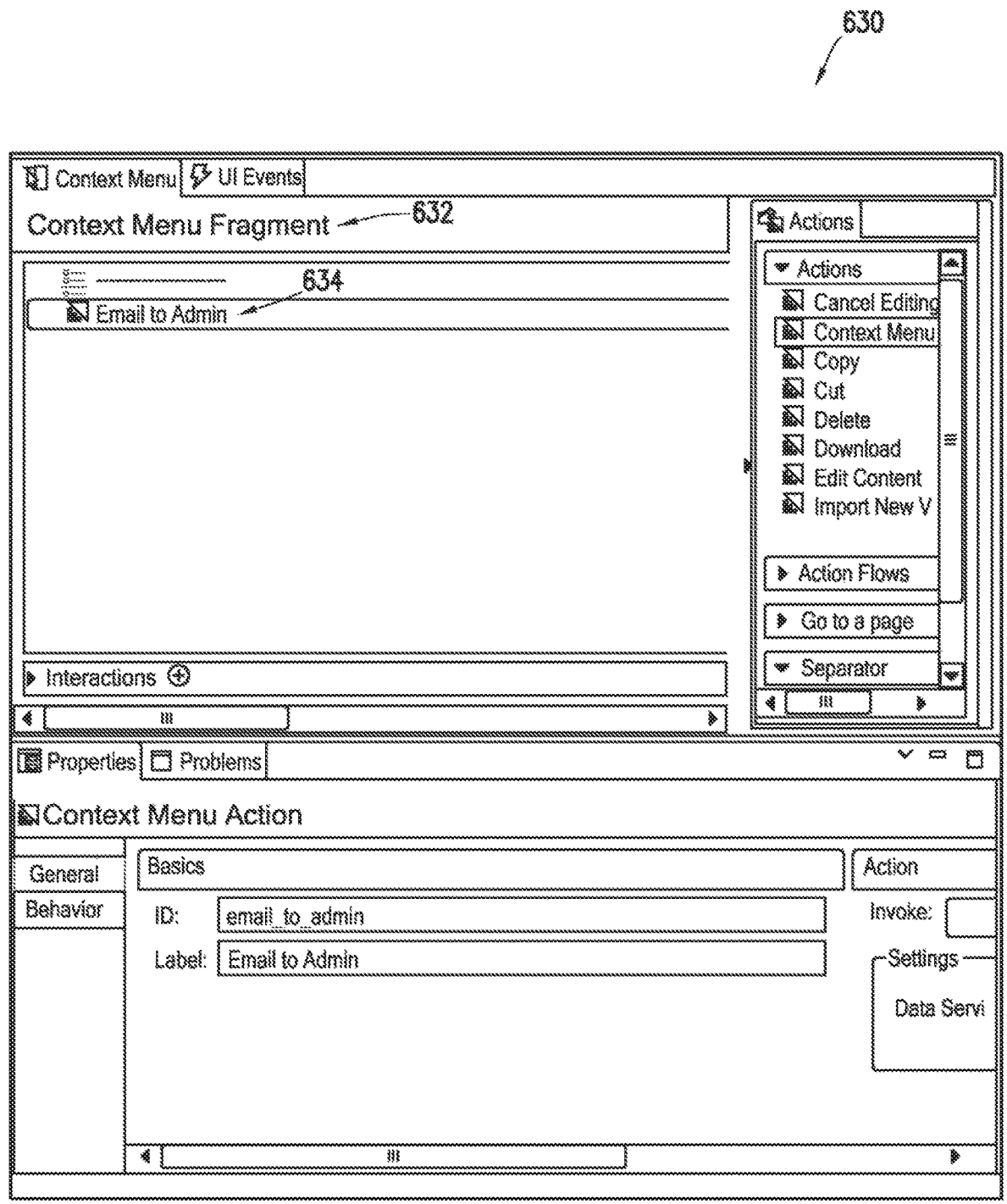
FIG. 6.3

CONTEXT MENU FRAGMENT MANAGEMENT

CROSS-REFERENCE TO RELATED APPLICATIONS

This application is a continuation of, and claims a benefit of priority under 35 U.S.C. 120 of the filing date of U.S. patent application Ser. No. 16/450,899, filed Jun. 24, 2019, entitled "CONTEXT MENU FRAGMENT MANAGEMENT," now U.S. Pat. No. 10,564,811, which is a continuation of U.S. patent application Ser. No. 14/671,289, filed Mar. 27, 2015, issued as U.S. Pat. No. 10,353,541, entitled "CONTEXT MENU FRAGMENT MANAGEMENT," the entire contents of which are hereby expressly incorporated by reference for all purposes.

BACKGROUND

A web application is a software application that executes in a web browser. The web application may include one or more features, such as graphical user interface widgets, processes, and other aspects of the web application. In developing a web application, a developer may desire to use features in one part of a web application into another part of the web application. In order to use features from one part of a web application into another, the developer may directly copy the part of the web application to the other part of the web application. Alternatively, in the case of processes, the developer may include a procedure call to the process.

BRIEF DESCRIPTION OF DRAWINGS

FIGS. 1, 2.1, 2.2, and 3 show schematic diagrams of systems in accordance with one or more embodiments of the technology.

FIGS. 4, 5.1, and 5.2 show flowcharts in accordance with one or more embodiments of the technology.

FIGS. 6.1, 6.2, and 6.3 show an example in accordance with one or more embodiments of the technology.

DETAILED DESCRIPTION

Figure 1:
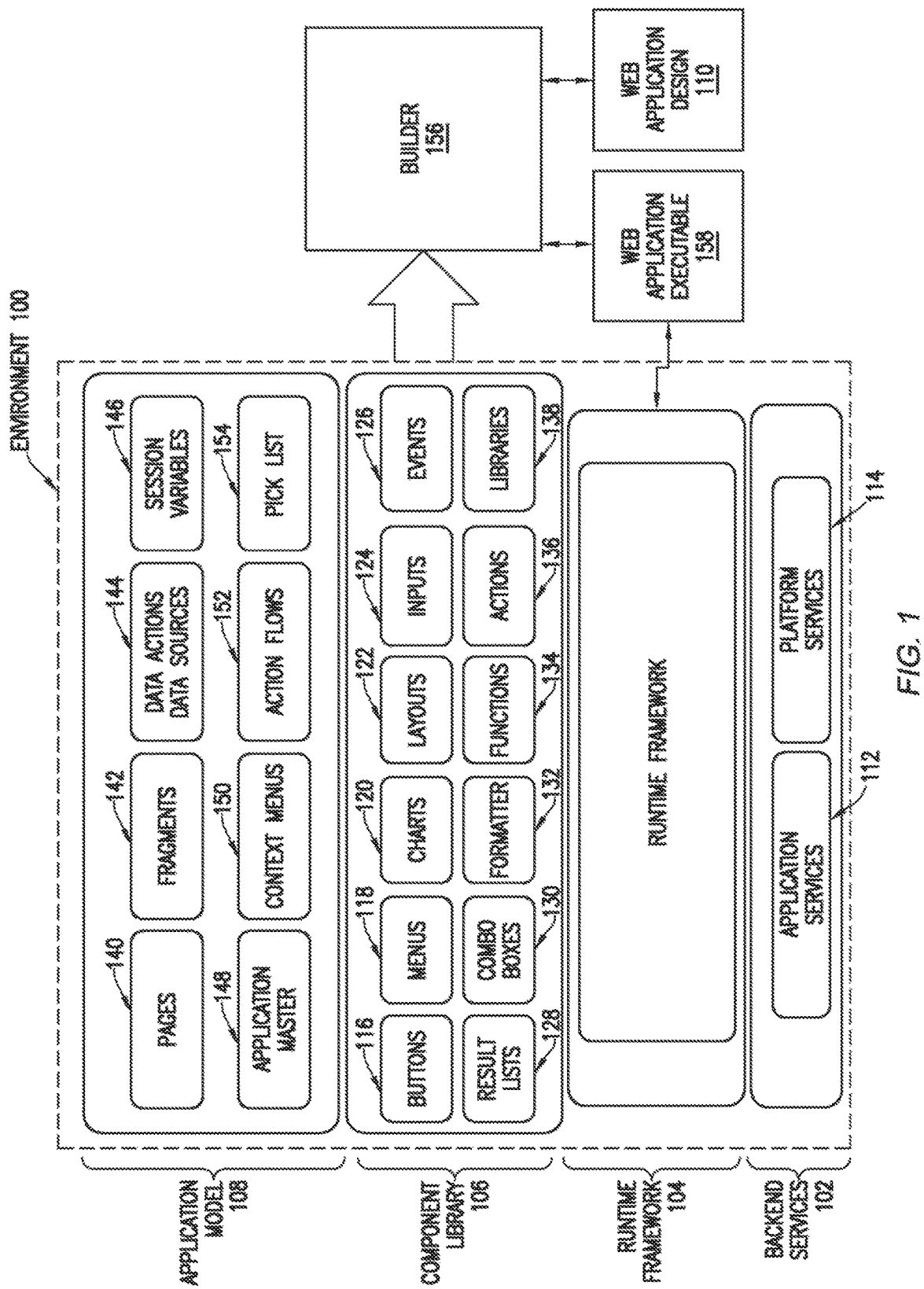

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments are directed to context menu fragment management to allow for portions of a context menu to be reused between context menus. A context menu is a menu of options, defined for a data type, which is displayed when a user selects an instance of the data type. During execution, an event triggering a display of the context menu may be triggered. At least one portion of the context menu is generated by performing an operation in a context menu fragment expression to obtain a context menu fragment identifier. The context menu fragment identified by the context menu fragment identifier is added to the context menu. Another portion of the context menu is also generated, and the context menu is presented. Thus, a user is able to select from menu options originating from a variety of sources while a developer may develop only a single context menu fragment.

FIG. 1 shows a schematic diagram of a system in accordance with one or more embodiments of the technology. Specifically, FIG. 1 shows a schematic diagram of an environment (100) for developing and executing a web application that implements the context menu fragment management. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The component library (106) may include user interface (UI) components and processing components.

In one or more embodiments of the technology, UI components are components that are displayed to an end user. In other words, instances of the UI components are displayed on a display device. In one or more embodiments of the technology, the UI components may include, but are not limited to, buttons (116) (e.g., radio buttons, common buttons), menus (118) (e.g., drop down menu, check boxes), charts (120), layouts (122), inputs (e.g., fields) (124) and combo boxes (130). UI components in the component library may each be associated with a set of options. The set of options define the execution of the UI component. Namely, the set of options define how a particular instance of the component is executed. Options associated with the UI components may include formatting, any text that is displayed, any action that is to be performed when the UI component is selected, other options, and/or any combination thereof. The action may be to: perform an operation on the page, transition to a specific static page, evaluate an expression to determine the page for transitioning, and/or perform another operation.

In one or more embodiments of the technology, the expression may specify one or more data sources and operations to perform on the data from one or more data sources. A data source is a location of data that is not within the expression. For example, the data source may be another portion of the application page or a data repository. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components are discussed below.

Formatter (132) are instructions which enable arranging of the data in specific formats in accordance with one or more embodiments of the technology. A formatter may be applied to number, date time values, other values, or a combination thereof. In accordance with one or more embodiments of the technology, functions (134) are the re-usable piece of code, which takes a set of inputs and returns an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files which constitute utility, and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), and a pick list (154). Each of these components of the application model is described below.

A page (140) in the application model (108) is a template for a web page. In other words, a page in the application model (108) is a template for a complete and individual document that is displayable to the end user. An activity fragment (142) represents at least a portion of an activity. In other words, an activity is a defined sequence of actions that an end user may perform using the web application. An activity fragment is a portion of the defined sequence of actions. Data actions and data sources (144) define the storage structure and storage location of the data and the actions to perform on the data.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. Context menus are discussed in further detail below and in FIG. 2.1.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items may be selected. In other words, more than one displayed item may be selected from a pick list.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a UI for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The UI of the builder (156) may include editor features and sub-systems. The editor features may include editors for modifying various aspects or views of the web application design, and/or a builder UI to assist in the development of the web application design in accordance with one or more embodiments of the technology. For example, the editors may include business objects, documents, cases, searches, reports, pages, roles, apps, widgets, and process editors. The builder UI may include a new artifact wizard, add-on top-level menu, add-on tool bar buttons, context menus, an artifacts properties page, and a model editor.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, package and deploy the web application. The builder (156) may also include components functionality to perform source control and project/library management.

FIG. 2.1 shows a schematic of a context menu definition (200) in accordance with one or more embodiments of the technology. As discussed above, context menus are instances of menus that are dependent on the context of the execution environment in which the menu is selected. In particular, a context menu is a menu of options, defined for a data type (202), which is displayed when a user selects an instance of the data type. For example, the data type (202) may be a particular page of the web application, a business object that represents a real-world object used by a business (e.g., customer, product, employer, company, etc.), a graphical user interface (GUI) widget displayable on a webpage of a web application, or another type of data.

The context menu may include multiple menu options (e.g., menu option Q (204), menu option R (206), menu option S (208), menu option T (210)). A menu option is an item that may be selected depending on a context. Each menu option (e.g., menu option Q (204), menu option R (206), menu option S (208), menu option T (210)) may have a name (not shown), one or more actions (not shown), and one or more attributes (not shown). The name of the menu option is the selectable label displayed to the end user. The action corresponds to the steps that are performed when the menu option is selected. For example, the action may be to save, delete, format according to the menu option, or another action.

The attributes of a menu option (e.g., menu option Q (204), menu option R (206), menu option S (208), menu option T (210)) may include, for example, the display state of the menu option, the enabled state of the menu option, and identifier of sub-menu options (e.g., sub-menu option W (212), sub-menu option V (214)). The display state has a value indicating whether the menu option is displayed or hidden. If displayed, an end user may view the menu option. If disabled, the menu option may exist in the instructions, but the end user may not see the menu option. The enabled state has a value indicating whether the menu option is enabled or disabled. If enabled, an end user may select the menu option. If disabled, the end user may not select the menu option. Sub-menu options (e.g., sub-menu option W (212), sub-menu option V (214)) are menu options that may be displayed when a parent menu option (e.g., menu option Q (204)) is selected. In one or more embodiments of the technology, all, some, or none of the menu options (e.g., menu option Q (204), menu option R (206), menu option S (208), menu option T (210)) may have sub-menu options (e.g., sub-menu option W (212), sub-menu option V (214)).

A context menu may include multiple portions (e.g., portion M (216), portion N (218)). In at least some embodiments of the technology, a portion of the context menu is a contiguous sequence of menu options for the context menu. Although FIG. 2.1 shows a particular ordering of portions, any ordering may exist without departing from the scope of the technology. Further, the portions may or may not have visible delineators that are displayed between portions when the context menu is displayed. One or more portions (e.g., portion M (216)) of the context menu may have menu options defined directly in the context menu definition. Some or all portions (e.g., portion N (218)) may be indirectly defined based on a context menu fragment expression (220).

In one or more embodiments of the technology, the context menu fragment expression (220) is a function that defines which context menu fragment (222) to include in the context menu. In some embodiments, the function is a simple assignment that has a constant context menu fragment identifier. In other embodiments, the context menu fragment expression (220) includes one or more operations in which, given a set of input data, generates output of a context menu fragment identifier from a set of possible context menu fragment identifiers.

A context menu fragment (222) is an incomplete section of context menu that may be incorporated into one or more context menus. In particular, a context menu fragment is separately stored from the context menu and may be defined for multiple context menus. As shown in FIG. 2.1, similar to the menu options (e.g., menu option Q (204), menu option R (206)) that are directly in the context menu definition, context menu fragments may have menu options (e.g., menu option S (208), menu option T (210)). Context menu fragments are discussed below with reference to FIG. 2.2.

Although FIG. 2.1 shows a single context menu fragment (222), multiple context menu fragments may be defined. In such a scenario, each context menu fragment may be selectable by the context menu fragment expression (220) depending on the particular execution of the web application. For example, a first context menu fragment may be defined for a case in which the end user is an employee and a second context menu fragment may be defined for a case in which the end user is a network administrator. In the example, the context menu fragment expression includes, as input, a role of the end user, and the first context menu fragment or the second context menu fragment may only be selected after the role of the end user is determinable.

FIG. 2.2 shows a schematic diagram of a context menu fragment definition (250) in accordance with one or more embodiments of the technology. As shown in FIG. 2.2, a context menu fragment definition (250) may include a context menu fragment identifier (252) and multiple menu options (e.g., menu option X (254), menu option Y (255)). The context menu fragment identifier (252) is a unique identifier of a context menu fragment. For example, the context menu fragment identifier may be an alphanumeric, binary, symbolic or any combination thereof string of characters. Other unique identifiers may be used without departing from the scope of the technology. Further, the unique identifier may be a derivable value based on a combination of identifiers.

As discussed above, a menu option is a selectable item by an end-user that allows the end user to issue a command. Each menu option may have a context menu option name (e.g., menu option X name (256), menu option Y name (258)) (discussed above with reference to FIG. 2.1), a configurable attribute expression (e.g., configurable attribute expression X (260), configurable attribute expression Y (262)), an action expression (e.g., action expression X (264), action expression Y (266)), or any combination thereof.

In one or more embodiments of the technology, a configurable attribute expression (e.g., configurable attribute expression X (260), configurable attribute expression Y (262)) is a function that defines the attribute value of a configurable attribute. A menu option may have multiple configurable attribute expressions, whereby a configurable attribute expression exists for each configurable attribute. In other embodiments, a single configurable attribute expression may define the attribute values for multiple configurable attributes. In some embodiments, the function is a simple assignment that has a constant configurable attribute value. In other embodiments, the configurable attribute expression includes one or more operations in which, given a set of input data, generates output of a configurable attribute value.

In one or more embodiments of the technology, an action expression (e.g., configurable attribute expression X (260), configurable attribute expression Y (262)) is a function that defines the action to perform when the menu option is selected. In some embodiments, the function is a simple assignment that has a predefined action value. For example, a menu option to store an instance of a data type may correspond to the same action regardless of the context. In other embodiments, the action expression includes one or more operations in which, given a set of input data, generates output of the identifier of the action. For example, a menu option to delete may correspond to a first action of an un-validated delete when the end user is an administrator and a validated delete requiring an additional code when the end user is an employee.

Similar to a context menu, a context menu fragment definition (250) may be defined for a particular data type. For example, as shown in FIG. 2.2, a context menu fragment may be defined for a child data type (268). A child data type (268) is a data type that inherits the properties of a parent data type (270). For example, the child data type (268) may include and, potentially, extend the properties of the parent data type (270). In one or more embodiments of the technology, the parent data type (270) does not include or extend the properties defined in the child data type (268). However, the context menu of the parent data type (270) may reference and use a content menu fragment of the parent's child data type (268). In other words, the context menu fragment of a child data type is visible to the parent data type of the child data type, and, thus, may be referenced in a context menu fragment expression of parent's context menu in accordance with one or more embodiments of the technology.

Although not shown in FIGS. 2.1 and 2.2, an executable for the context menu may be maintained in a context menu artifact, and an executable for the context menu fragment may be maintained in a context menu fragment artifact. In general, an artifact is a data structure or file generated by the builder to store instructions for the context menu. Thus, the menu options, sub-menu options, and context menu fragment expression may be maintained in a context menu artifact in accordance with one or more embodiments of the technology. Similarly, the components of a context menu fragment may be maintained in a context menu fragment artifact in accordance with one or more embodiments of the technology.

Further, in some embodiments of the technology, a context menu fragment may be a portion of one context menu and the entirety of another context menu. For example, the context menu fragment definition may be a context menu definition for a child data type while being referenced in a context menu fragment expression as only a portion of the context menu definition for the parent data type.

Figure 3:
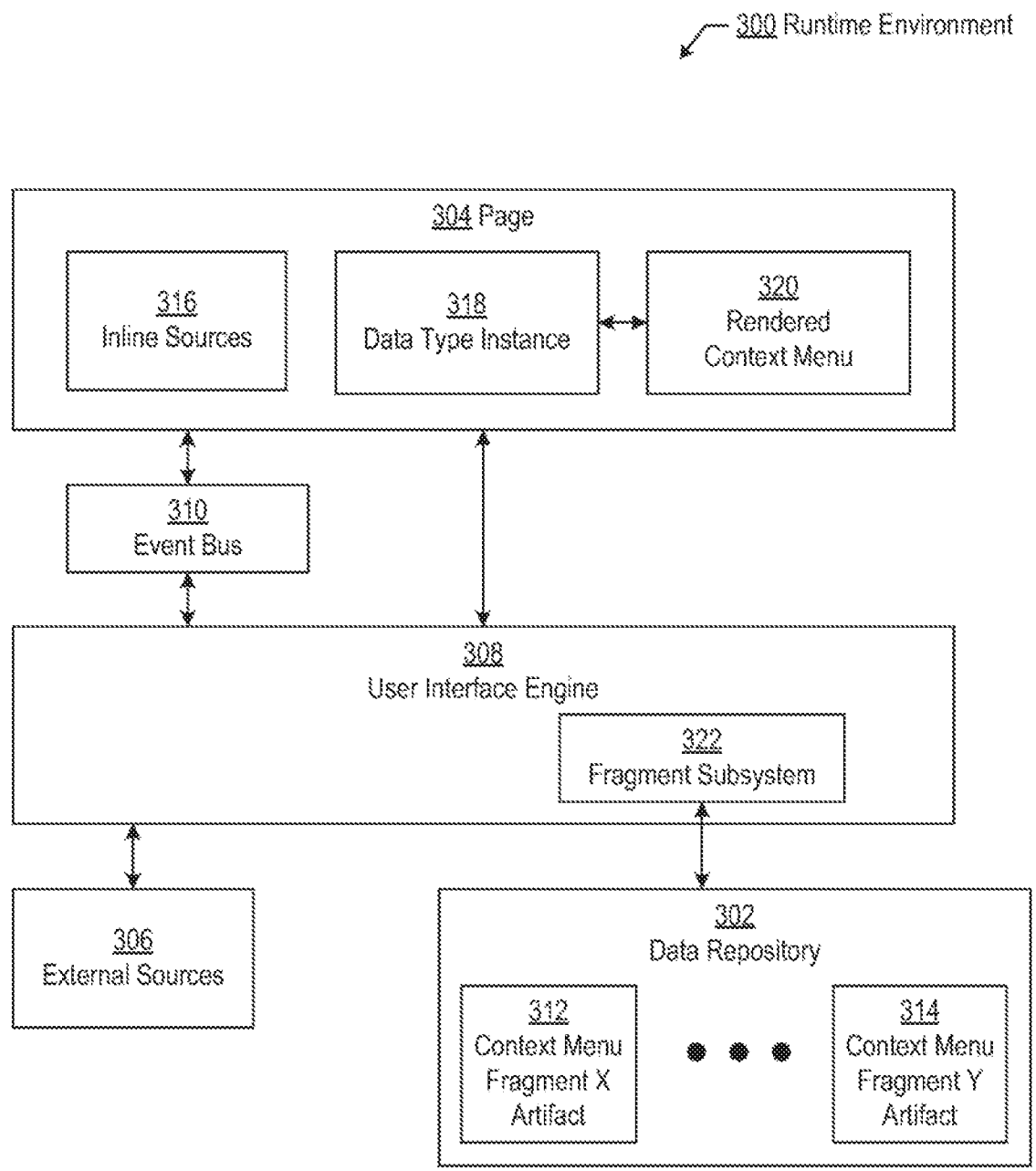

FIG. 3 shows a schematic diagram of a runtime environment (300) in accordance with one or more embodiments of the technology. As shown in FIG. 3, the runtime environment (300) includes a data repository (302), a page (304), an event bus (310), external sources (306), and a UI engine (308) in accordance with one or more embodiments of the technology.

In one or more embodiments of the technology, the data repository (302) is any type of storage unit and/or device (e.g., a file system, database, collection of tables, or any other storage mechanism) for storing data. Further, the data repository (302) may include multiple different storage units and/or devices. The multiple different storage units and/or devices may or may not be of the same type or located at the same physical site. The data repository (302) includes functionality to store context menu fragment artifacts (e.g., context menu fragment X artifact (312), context menu fragment Y artifact (314)) in accordance with one or more embodiments of the technology. In some embodiments, the context menu fragment artifacts (e.g., context menu fragment X artifact (312), context menu fragment Y artifact (314)) are stored and accessed locally on a user's computer that executes the browser that displays the web application. In other words, rather than accessing a server each time a user selects to display a context menu, a local repository may be accessed. In additional or alternative embodiments, the context menu fragment artifacts are stored on and retrieved from a server.

Continuing with FIG. 3, a page (304) is a web page of a web application. A page (304) may include inline sources (316), a data type instance (318), and a rendered context menu (320). Inline sources (316) are data sources that are on the page or hidden, but in a definition of the page (304). For example, inline sources may include widgets, data services, other content, and other sources available on the page. A widget is a GUI object on the page, such as a text field, a check box, radio button, tab, and other such UI elements. Data services are sources of end user data, such as data gathered from the end user and/or a data repository in one or more embodiments of the technology. Other content may include pictures, text blocks, and other information displayed on the page.

A data type instance (318) is an instance of a data type. For example, a data type instance may be a particular page (304), a particular object, a widget, or another instance of a data type. A rendered context menu (320) is a context menu that is displayable and/or displayed on the page (304). In one or more embodiments of the technology, the rendered context menu appears as any context menu, but includes menu options from context menu fragments. In other words, the rendered context menu has a collection of names of menu options, whereby selection of a menu option may cause an action to be performed or a sub-menu option to be displayed.

In one or more embodiments of the technology, the page (304) is operatively connected to a UI engine (308). The connection may be direct or indirect. Further, the UI engine (308) may be on a local computing device executing a browser that is displaying the page (304). The UI engine (308) may be hardware, software, firmware, or a combination thereof that includes functionality to manage execution of any processes of the page, such as manage the display of context menus.

The UI engine includes a fragment subsystem (322). The fragment subsystem (322) may be hardware, software, firmware, or a combination thereof that includes functionality to manage the selection and obtaining of a context menu fragment based on the context menu fragment expression. The fragment subsystem may further include functionality to incorporate a context menu fragment into a rendered context menu.

In one or more embodiments of the technology, the page is operatively connected to an event bus (310). An event bus (310) is a bus for transferring events to the UI engine (308). In other words, the triggering of an event is managed by the event bus (310), which triggers execution of the appropriate portion of the UI engine (308). For example, if the event is a selection to display the context menu, then the event bus transfers control to the fragment subsystem (322). If the event is a selection of a menu option, the event bus (310) may transfer control to another portion of the UI engine (308).

External sources (306) are sources that exist outside of the page (304). For example, external sources may include UI events and session variables. UI events may include the various interactions between a page and an end user. For example, a UI event may include a start of submission of data, a selection of a navigation trigger, a switching to another field, or another event. Session variables may be the same or similar to the session variables discussed above with reference to FIG. 1. Further, session variables may also be referred to as session parameters. For example, the session variables may include a session identifier, user identifier of a user, identifier of a current instruction being executed, browser information, value of various variables, and any other state information describing the execution environment and execution of the process.

In one or more embodiments of the technology, the inline sources (316), external sources (306), and page (304) may be referred to as a context. In other words, the context describes the entire execution environment of the page (304). As discussed above, at least a portion of the context menu may be dependent on at least a portion of the context.

While FIGS. 1, 2.1, 2.2, and 3 show a configuration of components, other configurations may be used without departing from the scope of the technology. For example, various components may be combined to create a single component. As another example, the functionality performed by a single component may be performed by two or more components.

Figure 4:
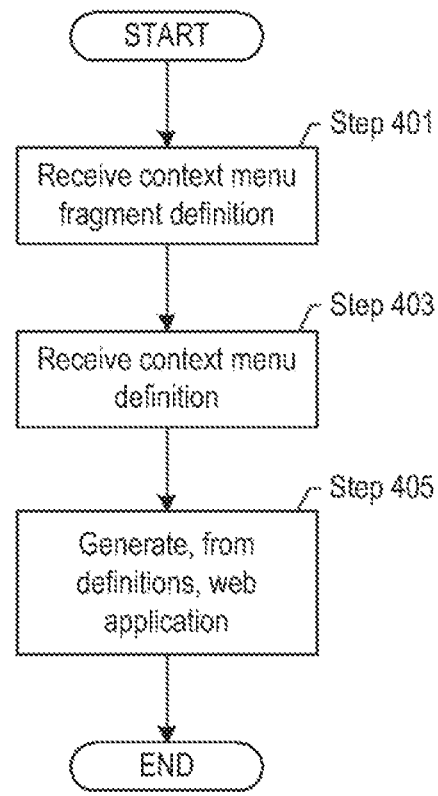

FIGS. 4, 5.1, and 5.2 show flowcharts in accordance with one or more embodiments of the technology. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 4 shows a flowchart for generating a web application design in accordance with one or more embodiments of the technology. In Step 401, one or more context menu fragment definitions are received in accordance with one or more embodiments of the technology. In one or more embodiments of the technology, a context menu fragment definition may be generated and received in a same or similar manner to generating a context menu definition.

In particular, the development environment shown in FIG. 1 facilitates an expression based development of a web application. Thus, using the developer tools offered by the development environment, a user may drag and drop components into a web application design to define various components of the web application design. Some of the components may have predefined templates and logic. In such a scenario, once dragged into the web application design, the user may submit values of various parameters of the components. For example, the user may submit a unique identifier, any references, or any other information.

For context menus and context menu fragments, some menu options for the context menu or context menu fragments have predefined names, attribute values, and corresponding actions. Thus, a developer may simply drag the menu option to the context menu definition in a web application design. In some embodiments, the developer may want to create a custom context menu option that may or may not be based on a previous context menu option. If the developer wants to create a custom context menu option, the developer may drag a new menu option to the context menu and define custom properties of the new menu option, such as the name, and attribute values. The developer may further select a corresponding action or set of actions from a list of possible actions for the menu option. Alternatively, in one or more embodiments, the developer may define a custom action with one or more steps using an expression in a text box. The developer may define sub-menu options for a context menu.

Within the developer environment, the builder may maintain an internal version of the web application design, such as in extensible markup language (XML) format that describes the web application design.

Thus, receiving the context menu fragment definition may include receiving the developer's input through the GUI of the developer environment and generating the internal version of the web application design while the web application design is being developed. In one or more embodiments of the technology, the developer may generate multiple context menu fragment definitions.

Further, in accordance with one or more embodiments of the technology, one or more of the context menu fragment definitions may be copied from other context menus or context menu fragments. For example, the developer may select a portion of a context menu or context menu fragment using the GUI of the developer environment and copy the selection to a new definition. The developer may make any further modifications of the copied context menu fragment definition(s).

In Step 403, context menu definitions are received in accordance with one or more embodiments of the technology. Receiving the one or more parent context menu definitions may be performed in a same or similar manner discussed above with reference to Step 401. In particular, the developer may provide the definition through the GUI of the developer environment as discussed above, and the builder may generate the internal version. As part of generating the parent context menu definition, the developer may include a context menu fragment expression. In other words, the developer may include a placeholder in parent context menu definition for a context menu fragment and specify the context menu fragment expression using an expression based language. Specifying the context menu fragment expression may include defining one or more operations and sources of data for selecting the context menu fragment. The developer may also define a default context menu fragment definition or indicate that no context menu fragment definition should be added when an invalid context menu fragment identifier results.

In one or more embodiments of the technology, the context menu fragment expression may refer to any context menu fragment, which may itself be a context menu, that is visible to the context menu fragment expression. For example, the context menu fragments may be visible that are in the same web application, in the same page, in the same process, or have other characteristics. By way of another example, when creating the context menu fragment definition, the context menu and context menu fragments for child data types may be visible to the parent data types. Additionally or alternatively, the context menu and context menu fragments for parent data types may be visible to the child data types in accordance with one or more embodiments of the technology.

Steps 401 and 403 may be performed multiple times to create additional context menu definitions and context menu fragment definitions. Further, additional steps may be performed to create and receive the web application design.

In Step 405, a web application is generated from the web application design in accordance with one or more embodiments of the technology. In one or more embodiments of the technology, generating the web application includes translating the internal version of the web application into a computer programming language set of instructions. The generation may be based on predefined templates of code for each portion of the web application design. The templates may be ordered according to the web application design and populated with parameters in the web application design.

As shown in FIG. 4, one or more embodiments may allow reuse of portions of context menus through a GUI development environment that uses dragging and dropping of web application components and expression based insertion of parameters. Once the web application is built, the web application may be executed.

FIGS. 5.1 and 5.2 shows generating a context menu in accordance with one or more embodiments of the technology. In Step 501, an event triggering display of the context menu is received. In execution, a data type instance or an instance of the data type may be selected by an end user to display a context menu based on a context menu definition. In one or more embodiments of the technology, the manner of selecting the context menu is not dependent on the context. Specifically, an end user may select the context menu in the same way and have different menu options (discussed below) presented based on the context.

In Step 503, generating the context menu is initiated in accordance with one or more embodiments of the technology. For example, the data type instance that is selected may be identified, and the corresponding data type determined. Based on the data type, the context menu artifact for the context menu defined for the data type may be obtained from local and/or remote memory.

In Step 505, a portion of the context menu is generated. The portion may be generated from the context menu artifact, and may correspond to menu options and sub-menu options in the context menu artifact or to a context menu fragment expression in the context menu artifact. For example, if the context menu artifact includes menu options and sub-menu options directly, then the menu options are added to the context menu according to the context menu artifact, such as in the order and according to the attribute in the context menu artifact. If a portion corresponds to a context menu fragment expression, then the context menu fragment expression is executed to add an identified and configured context menu fragment to the context menu. Adding a context menu fragment to the context menu is discussed in further detail below and in FIG. 5.2 in accordance with one or more embodiments of the technology.

In Step 507, a determination is made whether another portion exists. In particular, multiple portions may exist whereby each portion may correspond to a context menu fragment or menu options directly defined in the context menu artifact. If another portion exists, the flow proceeds to Step 505 to add the next portion. Although FIG. 5.1 shows adding portions in sequence, one or more embodiments may add portions in parallel.

Continuing with FIG. 5.1, in Step 509, the context menu is presented in accordance with one or more embodiments of the technology. Presenting the context menu may include displaying the context menu, such as in a web browser. When the context menu is displayed, the user may select an enabled and visible name of a menu option from the context menu to issue a command to perform the action referenced by the menu option. Based on the selection, the action is performed.

Turning to FIG. 5.2, FIG. 5.2 shows a flowchart for adding a portion to the context menu when the portion corresponds to a context menu fragment. In Step 521, a context menu fragment expression is obtained in accordance with one or more embodiments of the technology. In one or more embodiments of the technology, the context menu fragment expression is obtained from the context menu artifact.

In Step 523, operations in the context menu fragment expression are performed using data from data sources referenced in the expression to obtain a result. For example, if the context menu fragment expression specifies data from data sources, then the data sources in the context menu fragment expression are identified. Data is obtained from the one or more data sources according to the context menu fragment expression. For example, the data may be obtained by accessing inline data sources, a data repository to identify user data, the values of process context variables, the values of fields within the page, other data source, or a combination thereof. The expression is executed using the obtained data to obtain a result in accordance with one or more embodiments of the technology. Executing the expression may include performing one or more operations in the expression. For example, the operations may include comparing data from a data source to a value, and selecting a context menu fragment if the data matches. As a result of executing the expression, a result is obtained. The result may be a unique identifier of an existing context menu fragment, a unique identifier of the default context menu fragment, an incorrect identifier, or an error identifier in accordance with one or more embodiments of the technology.

In Step 525, a determination is made whether the result is a valid context menu fragment identifier. If the result is a valid process fragment identifier, the flow proceeds to Step 527. In Step 527, if the result is a valid context menu fragment identifier, then the identified context menu fragment is obtained as the obtained fragment. In other words, the context menu fragment artifact corresponding to the context menu fragment identifier is obtained from the data repository.

If the result is not a valid context menu fragment identifier, then the flow proceeds to Step 529. In Step 529, the default context menu fragment is obtained as the obtained context menu fragment. The default context menu fragment may be defined within the context menu artifact. Alternatively, the default context menu fragment may be obtained from the data repository. In some embodiments, no default exists. In such a scenario, the flow may return to FIG. 5.1 to process the next portion of the context menu.

In Step 531, configurable attribute expression(s) and action expression(s) for the obtained context menu fragment are obtained. In one or more embodiments of the technology, for each menu option, in sequence and/or in parallel, the configurable attribute expressions and the action expression(s) may be extracted from the context menu fragment artifact. Thus, the context menu fragment may be configured for the particular context in which the context menu fragment is being used.

In Step 533, operations in the configurable attribute expression(s) are performed to obtain configurable attribute values in accordance with one or more embodiments of the technology. The operations may be performed in a same or similar manner discussed above with reference to Step 523. For example, portions of the context menu fragment that should be disabled or hidden are disabled or hidden in the context menu displayed to the user.

In Step 535, the context menu fragment is added to the context menu according to the configurable attribute values and actions in accordance with one or more embodiments of the technology. In one or more embodiments of the technology, the menu options of the context menu fragment are added to the context menu in a same or similar manner to adding menu options from the context menu artifact. In other words, the names of the menu options may be listed in the context menu and enabled and/or displayed according to the configurable attribute values. The names are associated with code, such that, when selected, the corresponding action is performed.

FIGS. 6.1, 6.2, and 6.3 show an example in accordance with one or more embodiments of the technology. The following example is for explanatory purposes only and not intended to limit the scope of the technology.

FIG. 6.1 shows an example context menu definition (602) in a developer UI (600) in accordance with one or more embodiments of the technology. The example context menu definition (602) has a context menu fragment item (604) and menu options (606). The context menu fragment item has properties of a context menu fragment expression (608) having several operations. Although FIG. 6.1 shows the selection of a Fragment ID or Expression radio buttons, for the purposes of this application, an assignment of a particular Fragment ID may also be deemed an expression. In one or more embodiments of the technology, the expression (608), when executed, loads either one of two context menu fragments: either a 'transformation options' context menu fragment or an 'email to admin' context menu fragment, depending on the role of the logged in user. Namely, if the role of the current user is admin, then the 'transformation options' context menu fragment (shown in FIG. 6.2) is loaded. Otherwise, the 'email to admin' context menu fragment (shown in FIG. 6.3) is loaded.

Continuing with the example, FIG. 6.2 shows an example developer UI (620) with the 'transformation options' context menu fragment (622). As shown in the example, when the 'transformation options' context menu fragment (622), two extra menu options (624) are loaded. One menu option is to transform the object to PDF and another menu option is to transform the object to HTML.

Continuing with the example, FIG. 6.3 shows an example developer UI (630) with the 'email to admin' context menu fragment (632). As shown in the example, when the 'email to admin' context menu fragment (632), a single extra menu option (634) is loaded. The extra menu option (634) is to email the object to an administrator.

Returning to FIG. 6.1, when the application is deployed and the context menu is displayed in the application, the context menu fragment expression (608) executes and the user role is used to determine which context menu fragment to load. In this example, if an admin user is logged in then the admin would have menu options to 'Transform to PDF' and 'Transform to HTML' visible as specified in FIG. 6.2.

Conversely, if the user is not an admin user then the user would see the menu option to 'Email to Admin' as specified in FIG. 6.3.

As shown in the example, one or more embodiments allow the developer to create a context menu that changes depending on the role of the user.

At the same time, the developer may keep portions of the context menu the same across all uses. Further, in one or more embodiments of the technology, because the context menu fragment may be referenced by different context menus, one or more embodiments may allow for reuse of context menu fragments in accordance with one or more embodiments of the technology.

Figure 7:
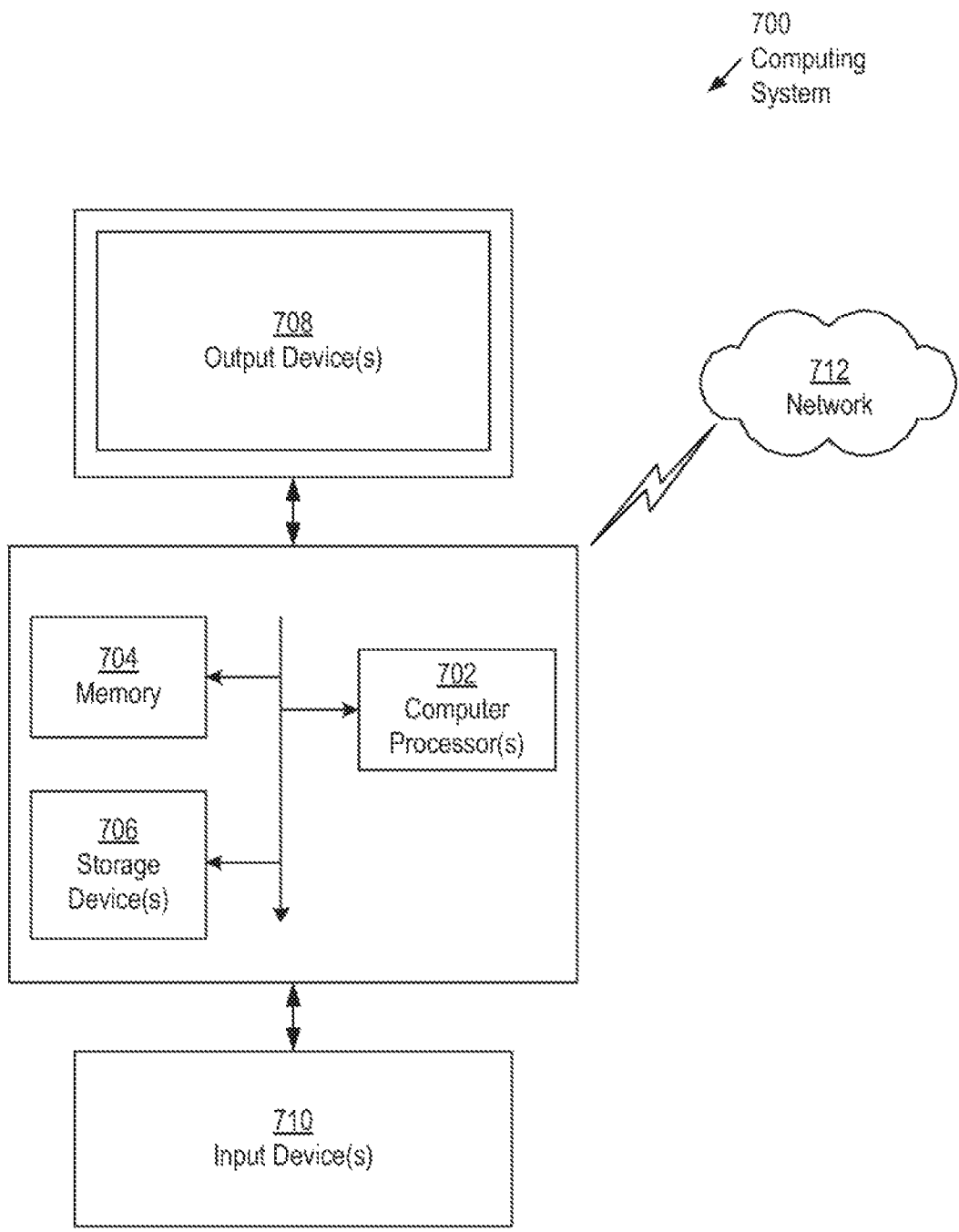
FIG. 7 shows a computing system in accordance with one or more embodiments of the technology.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory.

The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A computer program product comprising a non-transitory computer-readable medium storing a set of computer-readable instructions, the set of computer-readable instructions comprising instructions for:
    receiving an event to trigger display of a context menu based on user interaction with a page of a web application;
    based on receiving the event, obtaining a context menu artifact that comprises a context menu fragment expression executable to output a first context menu fragment identifier from a set of possible context menu fragment identifiers, the context menu fragment expression including a first operation on first data from a first data source;
    executing the context menu fragment expression to output the first context menu fragment identifier;
    based on a determination that the first context menu fragment identifier output from execution of the context menu fragment expression is a valid context menu fragment identifier that identifies a first context menu fragment from a plurality of context menu fragments stored in a data repository, obtaining the first context menu fragment from the plurality of context menu fragments as an obtained context menu fragment, each of the plurality of context menu fragments having an associated unique context menu fragment identifier;
    based on a determination that the first context menu fragment identifier output from execution of the context menu fragment expression is an invalid context menu fragment identifier, obtaining a second context menu fragment as the obtained context menu fragment;
    generating a first portion of the context menu using the obtained context menu fragment; and
    adding the first portion of the context menu to the context menu.

2. The computer program product of claim 1, wherein the set of computer-readable instructions further comprise instructions for:
    storing the context menu artifact for the context menu in the data repository, wherein the context menu is defined for a first data type; and
    storing a first context menu fragment artifact for the first context menu fragment in the data repository, the first context menu fragment artifact identified by the first context menu fragment identifier.

3. The computer program product of claim 2, wherein the event identifies a data type instance and wherein the set of computer-readable instructions comprises instructions for:
    identifying the data type instance from the event and determining the first data type based on the data type instance wherein the context menu artifact is obtained based on determining the first data type; and
    obtaining the context menu fragment expression from the context menu artifact for execution.

4. The computer program product of claim 3, wherein the context menu artifact includes a context menu option and wherein the set of computer-readable instructions comprises instructions for generating a second portion of the context menu, the second portion of the context menu including the context menu option.

5. The computer program product of claim 3, wherein the set of computer-readable instructions comprises instructions for obtaining the first context menu fragment for use in generating the first portion of the context menu from the first context menu fragment artifact.

6. The computer program product of claim 5, wherein the first context menu fragment artifact comprises a configurable attribute expression, the configurable attribute expression comprising a second operation on second data.

7. The computer program product of claim 6, wherein the set of computer-readable instructions comprises instructions for:
    performing the second operation to obtain a configurable attribute value; and
    configuring the first context menu fragment according to the configurable attribute value.

8. The computer program product of claim 1, wherein the context menu is defined for a parent data type and the first context menu fragment is defined for a child data type of the parent data type.

9. The computer program product of claim 8, wherein the set of computer-readable instructions comprises instructions for displaying the context menu for an instance of the parent data type.

10. The computer program product of claim 1, wherein the first data source is an in-line data source in the page.

11. The computer program product of claim 1, wherein the first data source is an external data source external to the page.

12. A method for controlling display of portion of context menus, the method comprising:
    storing a plurality of context menu fragments, each context menu fragment in the plurality of context menu fragments having an associated unique identifier;
    receiving an event to trigger display of a context menu based on user interaction with a page of a web application; and
    based on receiving the event, generating the context menu for display in the page, wherein generating the context menu comprises:
        obtaining a context menu artifact that comprises a context menu fragment expression to output a first context menu fragment identifier from a set of possible context menu fragment identifiers and an indication of a second context menu fragment to use if the first context menu fragment identifier is invalid, the context menu fragment expression including a first operation on first data from a first data source;
        executing the context menu fragment expression to output the first context menu fragment identifier;
        based on a determination that the first context menu fragment identifier output from execution of the context menu fragment expression is a valid context menu fragment identifier that identifies a first context menu fragment from the plurality of context menu fragments, selecting the first context menu fragment from the plurality of context menu fragments; and
        generating a first portion of the context menu using the first context menu fragment; and
        adding the first portion of the context menu to the context menu.

13. The method of claim 12, further comprising:
storing the context menu artifact for the context menu in a data repository, wherein the context menu is defined for a first data type; and
storing a first context menu fragment artifact for the first context menu fragment in the data repository, the first context menu fragment artifact identified by the first context menu fragment identifier.

14. The method of claim 13, wherein the event identifies a data type instance and wherein generating the context menu comprises:
identifying the data type instance from the event and determining the first data type based on the data type instance, wherein the context menu artifact is obtained based on determining the first data type
obtaining the context menu fragment expression from the context menu artifact for execution.

15. The method of claim 14, wherein the context menu artifact includes a context menu option and wherein generating the context menu comprises generating a second portion of the context menu, the second portion of the context menu including the context menu option.

16. The method of claim 14, wherein generating the context menu comprises obtaining the first context menu fragment for use in generating the first portion of the context menu from the first context menu fragment artifact.

17. The method of claim 16, wherein the first context menu fragment artifact comprises a configurable attribute expression, the configurable attribute expression comprising a second operation on second data.

18. The method of claim 17, further comprising:
performing the second operation to obtain a configurable attribute value; and
configuring the first context menu fragment according to the configurable attribute value.

19. The method of claim 12, wherein the context menu is defined for a parent data type and the first context menu fragment is defined for a child data type of the parent data type.

20. The method of claim 19, further comprising displaying the context menu for an instance of the parent data type.

21. The method of claim 12, wherein the first data source is an in-line data source in the page.

22. The method of claim 12, wherein the first data source is an external data source external to the page.

* * * * *